United States Patent Office 3,624,984
Patented Dec. 7, 1971

3,624,984
METHOD AND APPARATUS FOR REMOVAL OF ORGANICS FROM CHEMICAL WASTE GASES
Domenic C. Ferrari, Winchester, and Carl G. Bertram, Brighton, Mass., assignors to The Badger Company Inc., Cambridge, Mass.
Filed June 15, 1970, Ser. No. 46,088
Int. Cl. B01d 47/12
U.S. Cl. 55—85                                   26 Claims

ABSTRACT OF THE DISCLOSURE

Chemical effluent waste gases from chemical plants, particularly effluent waste gases from phthalic anhydride and maleic anhydride plants, are effectively water washed of residual organic matter (98 to 99% removal) in a wet scrubber using recycled water to concentrate the organic pollutants in the scrubber liquor. A concentrated liquid purge (blowdown) from the scrubber recycle circulating loop is directed to a thermal incenerator where the purge is vaporized and the organic pollutants are oxidized to non-pollutant products.

THE PROBLEM

In the production of phthalic anhydride (hereinafter referred to as PA), switch condenser off gases, i.e. the off gases from the solid condensers (these are condensers for condensing the PA as a solid out of the hot reaction product gas formed by the vapor phase catalytic oxidation of naphthalene or o-xylene with air, the reaction product gas stream being alternately switched from one bank of solid condensers to another to permit the solidified PA to be melted out of the off-stream condensers), have been classically treated to remove organic pollutants therefrom by washing with large quantities of once-through water in an appropriate scrubber prior to discharging to the atmosphere via a vent stack. Typical removal efficiencies of organic pollutants range upwards of 95 percent with once-through water scrubbers. However, with the use of once-through water at the scrubber in this way, a considerable water pollution problem has always existed due to the large quantity of polluted water which must be disposed of.

In recent years, in order to overcome the water pollution problem, the switch condenser off gases have been thermally incinerated at 1200–1350° F. without the use of a scrubber. This method involves handling an enormous quantity of gas and without heat recovery, requires approximately 12,500 B.t.u./lb. PA produced of additional fuel. Heat recovery, via this method, can reduce the fuel requirements to 2,000–4,000 B.t.u./lb. PA; however, at a considerable increase in investment since heat is exchanged between the incoming off gases and combusted incinerator effluent gas. Furthermore, if there is a heat recovery above 40 percent, then preheating the off gases to high temperatures (850–1000° F.) cannot be avoided. This must be carefully done to avoid pre-ignition of the combustible content of the off gases. With the use of conventional multiple solid PA switch condensers operating in cycles, the carryover of solid PA dust, which is combustible, has consistently been a problem, especially during startups and shutdowns. It is this intermittent carryover of combustible material, which can pre-ignite (explode) in a pre-heat section of a thermal gas incineration system, which labels this system as a dangerous safety hazard.

The problem of economically and safely removing organic pollutants from chemical waste gases to avoid air pollution and without creating a water pollution problem is found in many chemical plants other than phthalic anhydride plants.

ELIMINATION OF THE PROBLEM BY THE INVENTION

The present invention eliminates both the water pollution problem of the once-through scrubber and the explosion hazard of the thermal gas incinerator while achieving between 98 and 99% removal of the organic pollutants. In addition, the economics, based on both fuel consumption and additional investment, are markedly better.

BRIEF DESCRIPTION OF THE INVENTION

This is achieved in accordance with the invention by scrubbing or washing the effluent waste gases in a wet, preferably countercurrently operated, scrubber with an aqueous scrubbing liquor, which is recycled to build up the concentration of the organic pollutants in the liquor so that the scrubbing liquor comprises water with a relatively high concentration of the oragnic pollutants. A concentrated liquid purge or blowdown is removed from the recycle circulating loop of the concentrated scrubbing liquor and is passed to an incinerator where it is vaporized and the organic pollutants oxidized to harmless non-pollutant compounds, such as $CO_2$ and water.

The concentration of organic pollutants, i.e. organics, in the scrubbing liquor may be controlled by the rate of removal of purge liquor since only enough fresh water is added to the system to replace that which is removed from the system in the purge liquor and which is evaporated and removed in the scrubbed off gas, which is saturated with water.

The concentration of organics in the scrubbing liquor is preferably at least sufficient to substantially saturate the water with the organics. However, concentrations of organics which are greater than saturation concentrations and, hence, which form a slurry of the solid organics in water (the scrubbing operation is carried out well below the melting point of the organics and hence at a temperature at which the organics exist in the solid state so that after the saturation point is reached the organics precipitate out as solids), are more preferred even though they are not as easy to physically handle. The maximum concentration is that beyond which the slurry is not readily flowable and, hence, becomes too difficult and impractical to circulate through the scrubber, pumps, valves and pipe lines. Also, it is preferred to atomize the purge liquor before vaporizing and burning it and the greater the slurry concentration of the purge the more difficult it is to atomize. In the case of most off gases from phthalic anhydride switch condensers, it has been found that slurries containing much more than 15 to 20% by weight of solid organics become impractically difficult to circulate. In fact, with such off gases it is preferred that the slurry not exceed 10–12% by weight solids since beyond this concentration difficulties in circulation commence to become noticeable. Actually, the maximum slurry concentration is a compromise between the greater economy achieved by increasing the total organics concentration in the scrubbing liquor and the increasing difficulty in circulating the more concentrated slurry. However, it is preferred to operate with as high an overall organics concentration which is practical to physically circulate the resulting slurry.

In terms of concentration of organics in the scrubbing liquor, both dissolved and in the form of slurry solids, it has been found that good results can be achieved with concentrations of from 10 or 20 to 40 or 50% by weight, depending on the amount of the different organics in the effluent waste gas being treated. Maximum organics concentration of both dissolved and solid organics depends on the solubility of the organics involved in view of the aforesaid limitation on maximum solids concentration in the slurry, i.e., the greater the solubility of the organics, the greater can be the maximum total concentration of both dissolved and undissolved organics before the maximum slurry concentrations are reached. Thus, a slurry having an organic solids contents of 10% by weight might contain between 10 and 30% by weight of organics depending on the amount of different organics present in the switch condenser off gas feed to the scrubber.

In this respect, typical organics found in the switch condenser off gases of a PA plant and their approximate solubility are shown in the following table:

TABLE I

| Component | Solubility in water at 100° F. (preferred scrubbing temperature) | Solubility in 40 wt. percent maleic acid aqueous solutions |
| --- | --- | --- |
| Maleic anhydride (this is hydrolized by the water in the scrubber to maleic acid). | | |
| Phthalic anhydride (this is hydrolized by the water in the scrubber to phthalic acid). | | |
| Maleic acid | Very soluble up to 40 wt. percent. | |
| Phthalic acid | Relatively insoluble | Slightly soluble up to 4.5 wt. percent. |
| Benzoic acid | do | Relatively insoluble. |
| Naphthaquinone (this is present when the PA is made from naphthalene but not when it is made from o-xylene). | do | Do. |

As noted in the above table, the solubility of phthalic acid increases with increasing maleic acid concentration. It is also believed that the solubility of similar organics in the off gases is increased with increase in dissolved maleic acid. Accordingly, it is preferred to operate the scrubber with as high a maleic acid concentration as possible, consistent with equilibrium limitations to minimize maleic anhydride in the scrubbed effluent gas, in order to maximize the solubility of phathalic acid and the other organics and thereby achieve maximum organics concentration in the purge liquor.

The effluent waste gases are hot and are not saturated with water to thereby cause evaporation of water in the scrubbing liquor which provides a cooling effect. This, together with the addition of sufficient cool, e.g. room temperature, fresh water to the scrubbing liquor to replace that leaving the system in the purge and that which is evaporated and leaves the system in the water saturated scrubbed off gases, maintains the temperature in the scrubber well below the boiling point of water, and in the case of off gases from the switch condensers in the manufacture of phthalic anhydride, the temperature can be maintained in this way between 90–120° F., more preferably between 95° and 105° F.

In a preferred embodiment, the scrubber consists of two or more liquid to gas scrubber stages, each scrubbing with different overall organic concentrations in the scrubbing liquor. Multiple scrubbing in this way increases removal of the organics and thereby minimizes the amount of organics which exit from the scrubber and enter the atmosphere. The first stage, i.e. the one in which the waste gases are first scrubbed, is operated with as high an overall organics concentration as is physically possible to circulate since a slurry will develop as aforesaid. The liquid is recycled in the first stage to build up the organics concentration and concentrated purge from the recycle circuit is passed to the incinerator as aforesaid.

The second stage and subsequent stages, if more than two are used, are operated with a lower organics concentration depending on the organics removal efficiency of the first stage or prior stages.

Although single stage scrubber pilot test runs with liquor slurries between 1 and 2% up to 9 and 10 percent solids resulted in excellent organics removal efficiencies, nevertheless, the build up of relatively high maleic acid concentrations in the liquor, which is highly desirable since this increases the solubility of the phthalic acid in the liquor as aforesaid, increases maleic anhydric emissions to the atmosphere. These increased emissions can be substantially reduced by the use of the second scrubber stage with a low organics concentration scrubbing liquor to remove final traces of maleic anhydride from the effluent gas (substantially all of the phthalic and benzoic acids and naphthaquinone are removed in the first stage) and also reduce concentrated organics liquid entrainment from leaving the scrubber.

The second stage scrubbing liquor is preferably recycled to build up the organics concentration thereof only slightly as compared to the first stage. However, since substantially all of the phthalic and benzoic acids and naphthaquinone are removed in the first stage the organics buildup in the second stage scrubbing liquor is chiefly maleic acid and the concentration thereof is relatively low, e.g. between ½ and 2 or 3% by weight, preferably not more than 5% by weight, all of which is dissolved in water. It is preferred that the maleic acid concentrations of the scrubbing liquor of the final stage be as low as possible in order to reduce to a minimum the maleic acid in the scrubbed gas vented to the atmosphere due to equilibrium effects. If the maleic acid concentration of the second stage scrubbing liquor is too high, this requires the addition of one or more additional stages until a very low concentration, e.g. below 2 or 3% is achieved.

Fresh water is added to the top of the final stage above the recycle inlet so that the off gases finally are washed by fresh water to substantially completely remove residual maleic acid therefrom and further reduce concentrated liquid entrainment leaving the scrubber.

Blowdown (purge) from the recycle circuit of the second stage supplies makeup scrubbing liquor to the first stage scrubber to thereby further increase the maleic acid concentration of the first stage scrubbing liquor.

Sufficient fresh makeup water is added to the top of the second stage scrubber and mixed with the second stage recycle liquor, as aforesaid, to replace that lost by evaporation and exit with the scrubbed gases from the scrubber (these scrubbed gases are saturated with water) and by removal in the scrubber purge or blowdown from the first stage recycle circuit to the incinerator, these being the only outlets from the system.

The blowdown (purge) from the first stage of a two stage scrubber or from the single stage of a single stage scrubber, instead of being fed directly to a liquid incinerator, as aforesaid, may alternatively be fed to an organic recovery section where the organic materials with a minimum of water present may be dehydrated.

An entrainment separator (mist eliminator) is preferred after the second scrubber stage when a two stage scrubber is used or at the scrubbed gas outlet of the single scrubber when a single scrubber is used to minimize liquid droplets leaving in the outlet gas to the atmosphere.

If more than one additional, i.e. additional to the first stage, scrubbing stages are used, each such additional stage has a scrubbing liquor recycle circuit and a controlled purge from such recycle circuit to the preceding stage where it combines with the recycle liquor of such preceding stage to form the makeup liquor of such preceding stage. The concentration of the organics decreases in each succeeding stage. The fresh water is added to the final stage and the mist eliminator is located in the scrubbed gas outlet of the final stage.

The organic acid scrubber liquors are very corrosive and the scrubber, pumps, valves and all associated piping should be constructed of a material which is resistant to corrosion thereby. Stainless steel such as 316SS is such a material, 316LSS being preferred where welding is required.

The liquid purge to the incinerator, with the use of a single or multiple stage scrubber, is preferably steam atomized and then vaporized and heated in the thermal incinerator where 99.9% conversion of the organics by oxidation to $CO_2$ and water vapor is accomplished. Based on the size of the plant, heat recovery may be achieved economically by preheating the required combustion air and/or generating steam with the hot flue gases discharging from the oxidation chamber of the incinerator.

The temperature in the incinerator is sufficient to cause rapid and complete oxidation of the organic compounds and may range from 1300–1800° F., preferably 1400–1600° F.

The amount of air added in the incinerator is at least sufficient to completely burn the fuel and the organic compounds and preferably is in excess, such as 25% excess, of stoichiometric amounts to do this.

The organic acids present in the scrubber purge to the incinerator have a fairly high heating value as shown below.

TABLE II

| Component: | Heat of combustion (gross), B.t.u./lb. |
| --- | --- |
| Maleic acid | 5,920 |
| Phthalic acid | 9,300 |
| Benzoic acid | 11,400 |
| Naphthaquinone | 12,500 |

Based on the above heating values, a 30 wt. percent organic purge liquor to the incinerator would require the minimum in utilities to maintain a stable flame in the incinerator, of approximately 120 B.t.u./lb. PA produced (operating at 1600° F.).

In addition, liquid waste by-product organic acids, anhydrides and polymer material recovered in the purification area of the PA plant can be directed to the same incinerator after atomization for efficient disposal (99.9% conversion of organics at 1400–1600° F.). This stream has an estimated heat content upwards of 10,000 B.t.u./lb. of waste.

In the purification section of PA plants, distillation columns are operated under vacuum normally requiring steam ejectors. With the use of non-condensing ejectors, the final exhaust gases from the ejectors containing aromatic components can also be directed to the incinerator for disposal, or directed directly to the water scrubber where the organic matter will be recovered as part of the net aqueous purge being fed to the incinerator.

Fuel requirements for complete combustion of the above material streams, which eliminates all organic vapor and aqueous waste from a phthalic anhydride plant, is minimal and only required to maintain a stable flame in the incinerator.

BRIEF DESCRIPTION OF DRAWINGS

Further advantages of the invention will be apparent from the following description of a preferred embodiment of the invention and the accompanying drawings in which.

DETAILED DESCRIPTION

Figure 1:
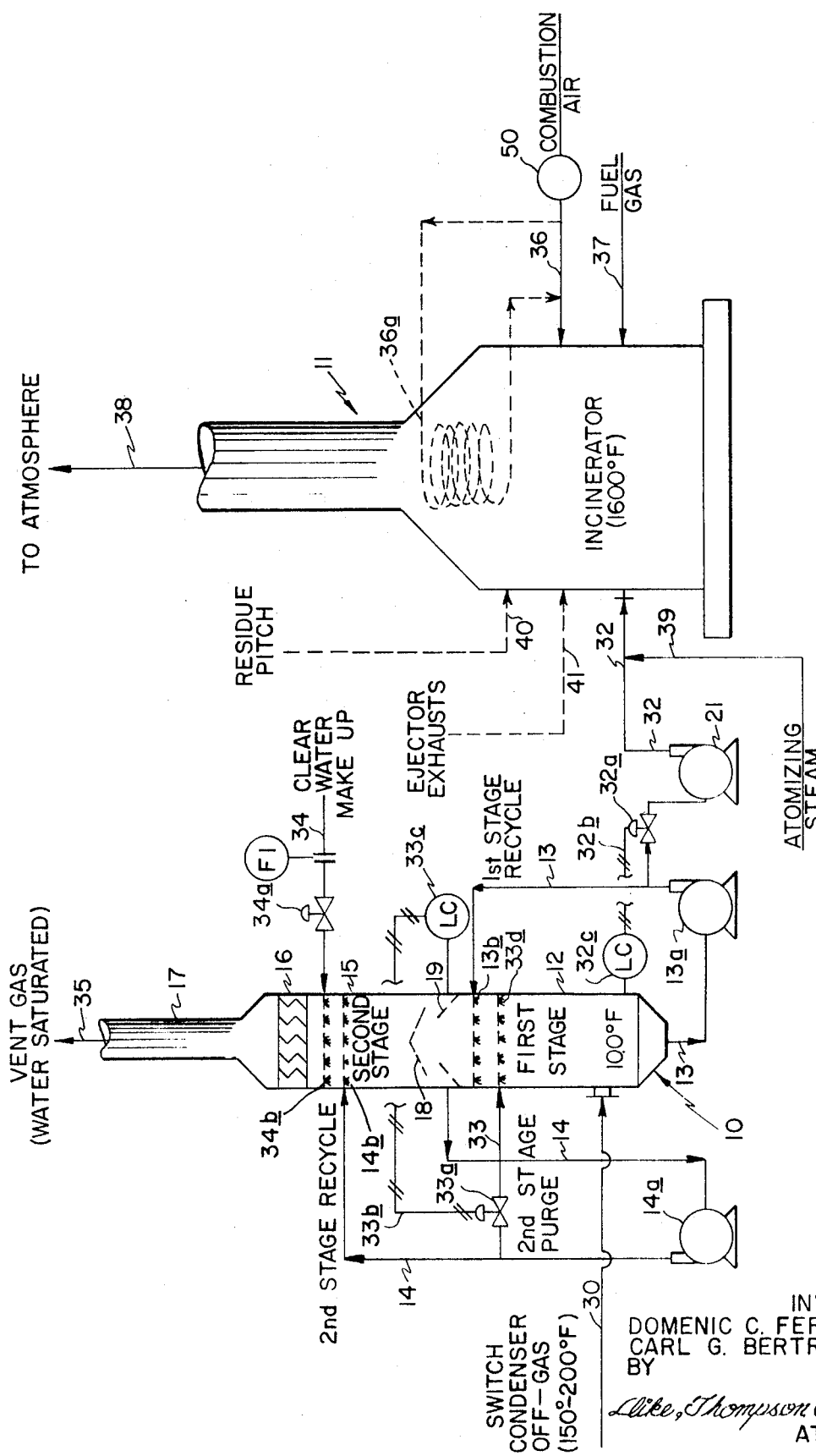
FIG. 1 is a diagrammatic and schematic flow sheet of a scrubber-incinerator combination embodying the invention.

With reference to the drawings, 10 represents a single shell two-stage, liquid-gas, slurry-handling scrubber and 11 represents a conventional aqueous incinerator for incinerating liquids, such as an incinerator sold by John Zink under the trade name Thermal Oxidizer. Switch condenser off-gas from the solid condensers of a phthalic anhydride plant containing organic pollutants, i.e. phthalic anhydride, maleic anhydride, benzoic acid and naphthaquinone, and at a temperature of 150–200° F. enters the scrubber 10 through line 30 and passes upwardly through the first scrubbing stage 12, where it is contacted with a countercurrent, downwardly flowing scrubbing liquor, comprising an aqueous slurry of the organic pollutants removed from the off gas during preceding cycles. The aqueous scrubbing liquor is introduced into the top of the first scrubbing stage 12 through line 13 and distribution manifold 13b. Essentially all of the phthalic anhydride, benzoic acid and naphthaquinone, along with approximately 80 percent of the maleic anhydride, are removed from the off gases by the scrubbing liquor in this way in the first scrubber stage 12. The organic anhydrides absorbed from the gas stream are hydrolized to the corresponding acids (one mole water per mole of organic anhydride), i.e. phthalic acid and maleic acid, in the scrubbing liquor by the water in the scrubbing liquor. It is also in the first scrubber stage 12 where the temperature of the off gas is reduced from 150–200° F. to approximately 100° F. as evaporation (of the water) cooling takes place and the gas stream becomes saturated with the evaporated water.

The organic pollutants are removed from the off gas by absorption into the scrubbing liquor and also by precipitation thereof when the liquor becomes saturated therewith since they exist in a solid state at the scrubbing temperature. Accordingly, an aqueous slurry of solid organic pollutants in a saturated solution thereof in water is formed.

The concentrated slurry at the bottom of first stage 12 is continuously recycled through line 13 to the upper portion of the first stage 12 by pump 13a.

The scrubbed gas stream from the first stage then proceeds upwardly through the second scrubbing stage 15, thence through the conventional mist eliminator 16 and thence out the stack 17 to the atmosphere at 35.

In the second stage 15, the gas is scrubbed with a counter-currently and downwardly flowing scrubbing liquor, comprising a dilute aqueous solution of organic pollutants (chiefly maleic acid) which is introduced into the top part of the upper stage 15 from line 14 and spray nozzles 14b and which is isolated from the first stage 12 and the first stage scrubbing liquor by a conical shaped deflector plate 18 and collection tray 19 in the intermediate portion of the scrubber. The collected liquor on tray 19 supplies hold up through the line 14 for the second stage liquor recycle pump 14a which pumps it to the upper end portion of the second stage 15 through line 14. This recycle liquor 14, together with fresh makeup water 34, which is introduced into the top of the second stage 15 at a point below the mist eliminator 16 and above the spray nozzles 14b and through the line 34, valve 34a and spray nozzles 34b, form the makeup scrubbing liquor for the second stage scrubber.

The scrubbed off gas from first scrubber stage 12 flows upwardly past the deflector 18 and past the second scrubber stage hold up liquor on tray 19 into the bottom of the second stage scrubber 15.

A portion of the recycle liquor 14 is continuously purged from the second stage recycle circuit 14 through the second stage purge or blowdown line 33 to control the concentration of organic pollutants in the second stage scrubbing liquor, the purge liquor 33 being flowed to the upper end portion of the first scrubber stage 12 through line 33 and spray nozzles 33d to combine with the first stage recycle liquor 13 to make up the first stage scrubbing liquor. The rate of second stage purge 33 removed from the recycle line 14 is controlled by a level controller device 33a, 33b and 33c.

It is in the second stage where the remainder of the maleic acid is removed from the gas stream, thereby providing an exit gas stream 35 essentially free of organic pollutants.

A controlled portion of the first stage concentrated recycle scrubbing liquor 13 is continuously purged from the recycle circuit 13 through first stage purge line 32 to control the concentration of organic pollutants in the scrubbing liquor of the first stage.

The rate of makeup water introduced at 34b is adjusted by valve 34a to replace water removed from the scrubber system (1) in the saturated scrubbed gas 35 (this is the water which is evaporated in the scrubber and saturates the gas stream) by evaporation and (2) in the purge line 32, these being the only exits from the system.

Each of the scrubber stages contains a fluid bed of packing on a supporting grid or grids to achieve intimate liquid-gas contact. The packing is made up of relatively large but light smooth-surfaced pieces such as spheres or rings or cylinders, e.g. Ping-pong balls or Pall Rings, which are large in bulk but very light in weight so that the bed can be easily fluidized but yet does not hold up the solid organic pollutant particles in the slurry. This type of packing and scrubber are conventional. One such scrubber construction using Ping-pong balls is sold by UOP Air Correction Division under the trade name Turbulent Contact Absorber.

Purge stream 32 from the scrubber first stage 12 is fed from the recycle line 13 through line 32 to the liquid incinerator 11 via pressure booster pump 21. The rate of flow of purge 32, which controls the concentration of organic pollutants in the first stage scrubbing liquor is controlled by a level controller device 32a, 32b, 32c.

Figure 2:
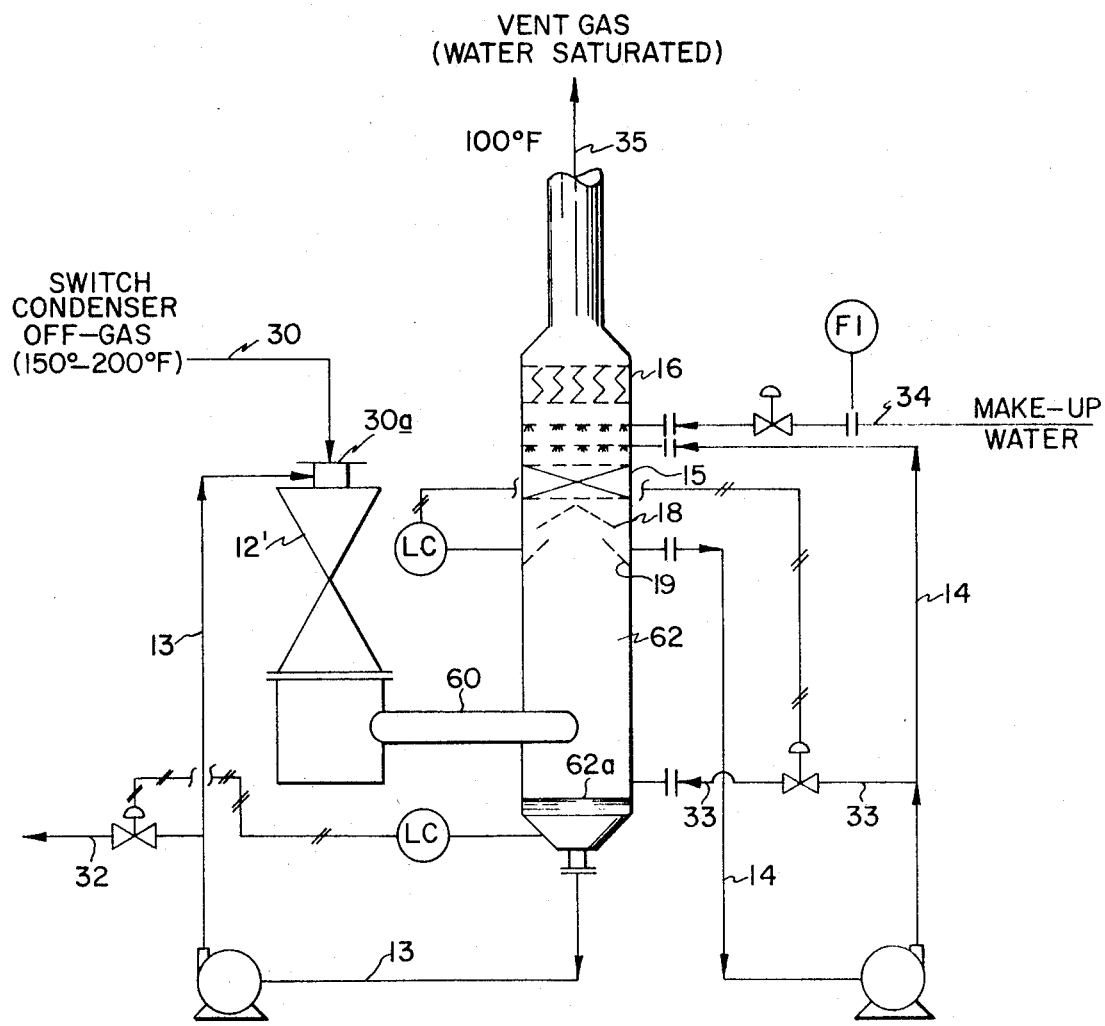
FIG. 2 is a view like FIG. 1 of another embodiment of the two stage scrubber of FIG. 1.

In FIG. 2 there is disclosed an alternative two stage scrubber system like FIG. 1, with the same numerals being used for like elements, except that the first scrubber stage 12' is a venturi type wet gas scrubber into the entry 30a of which the effluent off gas 30 and recycle liquor 13 are fed, as shown. The scrubbing liquor is divided into fine droplets suspended in the gas stream in the venturi to provide intimate liquid-gas contact. The scrubbed gases and fine droplets of scrubbing liquor contained therein exiting from the venturi pass through line 60 to the deentrainment chamber 62, where the liquid droplets are deentrained from the fine suspension thereof in gas and collect at 62a at the bottom of the chamber. The collected liquor is recycled through line 13 via pump 13a to the entry of the venturi type first stage scrubber 12'. The scrubbed gases pass upwardly through the deentrainment chamber 62 past the deflector 18 and second stage liquor collection tray 19 into the second stage scrubber 15, which is the same as the second stage scrubber in FIG. 1. The purge 33 from the recycle circuit 14 is fed to the bottom of the deentrainment chamber 62 as makeup liquor for the first stage.

In FIG. 2 the bottom part of the shell of FIG. 1 in which the first scrubber is located becomes the deentrainment chamber of FIG. 2.

Atomizing steam 39 is introduced into the liquid purge stream 32 to finely divide it immediately before it enters the combustion area of the incinerator 11. Preferably the atomizing guns discharge the atomized liquid directly into the combusion zone. It is preferred to atomize the purge immediately before incineration to eliminate the danger of converting maleic acid to the more insoluble fumaric acid before burning occurs. The purge can be atomized with pressurized air if desired.

Combustion air (through air pump 50) and fuel gas, e.g. methane, are introduced into the incinerator at 36 and 37, respectively, in conventional manner, to provide a temperature of 1400–1600° F. The rate of flow of combustion air is in excess of the stoichiometric amounts required to completely burn the fuel gas to $CO_2$ and $H_2O$ and to competely oxidize the organic pollutants in the purge stream to $CO_2$ and water. A part of the air can also be introduced with the atomizing steam.

Additional organic pollutant-containing liquid waste streams from the PA plant, including the residue pitch 40 from the purification area or areas of the PA plant and PA distillation column ejector exhausts 41, may also be fed to the incinerator, where, at 1400–1600° F., the organic pollutants therein are 99.9% oxidized to carbon dioxide and water.

If desired, the combustion air 36 can be pre-heated by the hot combustion gases by leading it through heat exchange coil 36a located at the top of the incinerator, as shown in broken lines in FIG. 1, before passing it into the incinerator at 36, to thereby provide recovery of heat.

Also the coil 36a can be used to generate steam for export to increase heat recovery.

Pre-heating of the aqueous scrubber or blowdown stream 32 is inadvisable since the maleic acid may be converted to fumaric acid.

EXAMPLE 500,000 lb./hr. of off gas from the switch condensers (solid condensers) of a phthalic anhydride plant, in which a phthalic anhydride reaction product gas is produced by vapor phase air oxidation of naphthalene in a catalytic bed and in which the phthalic anhydride is removed from the reaction product gas by passing the hot reaction product gas first through liquid condensers and thence through the switch solid condensers, enters the scrubber 10 through line 30 at 150° F. The off gases are contaminated with organic pollutants and have the following composition:

| Component | Lb./hr. | Wt. percent |
|---|---|---|
| Air | 489,000 | 97.8 |
| $H_2O$ | 10,000 | 2.0 |
| Maleic anhydride | 640 | .128 |
| Phthalic anhydride | 310 | .062 |
| Benzoic acid | 25 | .005 |
| Naphthaquinone | 25 | .005 |
| Total | 500,000 | 100.00 |

At steady state, the following table illustrates the material balance flows associated with the scrubber-incinerator system in FIG. 1 with reference to the stream number locations:

TABLE III

| Stream Number: | Components | Lb./hr. | Weight percent | Temperature, °F |
|---|---|---|---|---|
| 32 | Maleic acid | 746 | 19.73 | 100 |
|  | Phthalic acid | 342 | [1] 9.05 |  |
|  | Benzoic acid | 24 | [1] .62 |  |
|  | Naphthaquinone | 23 | [1] .60 |  |
|  | Water | 2,645 | 70.00 |  |
|  | Total | 3,780 | 100.00 |  |
| 33 | Maleic acid | 149 | 1.07 | 100 |
|  | Water | 13,775 | 98.93 |  |
|  | Total | 13,924 | 100.00 |  |
| 34 | Water | 13,798 | 100 | 60 |
| 35 | Air | 489,000 | 95.88 | 100 |
|  | Water | 21,000 | 4.11 |  |
|  | Maleic anhydride | [2] 10 | [2] 20 |  |
|  | Phthalic anhydride | [2] 5 | [2] 10 |  |
|  | Benzoic acid | [2] 1 | [2] 2 |  |
|  | Naphthaquinone | [2] 2 | [2] 4 |  |
|  | Total | 510,018 | 100 |  |
| 36 | Oxygen | 1,810 | 23.2 | 60 |
|  | Nitrogen | 5,978 | 72.8 |  |
|  | Total | 7,788 | 100 |  |
| 37 | Fuel gas—methane | 65 | 100 | 60 |
| 38 | Oxygen | 340 | 2.64 |  |
|  | Nitrogen | 5,978 | 46.37 |  |
|  | Organics | [2] 1.0 | [2] 77 |  |
|  | $H_2O$ | 4,414 | 34.24 |  |
|  | $CO_2$ | 2,160 | 16.75 |  |
|  | Total | 12,892 | 100 |  |
| 39 | Water-atomizing steam | 1,260 | 100 | 366 |

[1] 7.37 weight percent as solids.
[2] Parts per million.

Any single stage or multiple stage water-gas scrubber can be used which can handle the slurries. Also, any incinerator construction which can handle atomized liquids can be used to vaporize and incinerate the atomized liquid purge.

The particular flow rates depend on the size of the plant and are not critical and may vary over a wide range.

The above described water scrubber with recycle to form a slurry can be used to advantage to recover maleic anhydride and phthalic anhydride from off gases containing the same, as well as to remove them as pollutants.

The above description and accompanying drawings of preferred embodiments of the invention are for purposes of illustration only and it is not intended that the invention be limited thereto or thereby but only to the method and apparatus claimed in the appended claims and their equivalents.

We claim:

1. A method of removing pollutant organic compounds from effluent waste gases to reduce air and water pollution comprising scrubbing said effluent gases with an aqueous scrubbing liquor to remove said organic compounds, recycling said scrubbing liquor to build up the concentration of said organic compounds therein, removing a portion of the recycle stream of said concentrated scrubbing liquor as a purge, passing said purge liquor through a thermal incinerator to vaporize it and to burn the concentrated organic compounds therein to non-pollutant compounds, and discharging the incinerated gases to the atmosphere.

2. A method according to claim 1, the amount of said purge being controlled to buid up the concentration of said organic compounds to at least the saturation point thereof.

3. A method according to claim 1, the amount of said purge being controlled to build up the concentration of said organic compounds to between the saturation point thereof and a point beyond said saturation point at which said organic compounds form a slurry of said compounds.

4. A method according to claim 3, said effluent waste gases being off gases from a phthalic anhydride plant, said organic compounds including phthalic anhydride and maleic anhydride.

5. A method according to claim 1, said scrubbing step comprising a multi-stage scrubbing step with recycle of scrubbing liquid to build up the concentration of organic compounds therein and with purge of recycle liquor in each scrubbing stage, the purge from the first stage being fed to the incinerator and the purge from each succeeding stage being fed to the preceding stage as scrubbing liquor makeup in addition to the recycled liquor of said preceding stage, the concentration of said organic compounds in the liquors of succeeding stages being substantially less than the concentration thereof in the preceding stage.

6. A method according to claim 5, said multi-stage scrubbing step comprising two stages and including adding makeup water to the second stage to replace water removed in the purge of the first stage and eveporated and removed in the scrubbed gases exiting from the second stage.

7. A method according to claim 5, said effluent gases being off gases from a phthalic anhydride plant, said pollutant organic compounds including maleic anhydride and phthalic anhydride, said multi-stage scrubbing step comprising two stages, said phthalic anhydride and maleic anhydride being hydrolized to phthalic acid and maleic acid in the aqueous scrubbing liquor, substantially all of the phthalic anhydride and most of the maleic anhydride being removed from said effluent gases in the first stage and substantially all of the rest of said maleic anhydride being removed in the second stage.

8. A method according to claim 1, including adding sufficient fresh water to the scrubbing liquor to replace water removed in the purge and evaporated and removed in the scrubbed gases.

9. A method according to claim 1, said pollutant organic compounds existing predominently in the vapor phase, said scrubbing step comprising scrubbing said effluent gases with an aqueous scrubbing liquor to absorb and remove said organic compounds from said vapor phase.

10. A method according to claim 1, said pollutant organic compounds including an organic anhydride in the vapor phase.

11. A method according to claim 10, said organic anhydride being hydrolyzed to the acid of said anhydride by said aqueous scrubbing liquor.

12. A method according to claim 10, said effluent gases being off gases from an organic anhydride plant.

13. A method according to claim 1, said effluent waste gases being off gases from a phthalic anhydride plant, said organic compounds including phthalic anhydride and maleic anhydride.

14. A method according to claim 13, the amount of said purge being controlled to build up the concentration of said organic compounds to at least the saturation point thereof.

15. A method according to claim 13, including atomizing said purge liquor before vaporizing it in the incinerator.

16. A method according to claim 5, including burning air and fuel in said incinerator to burn said organic compounds, the amount of air fed to said incinerator being greater than the stoichiometric amount to burn the fuel to $CO_2$ and water and to burn said organic compounds to $CO_2$ and water.

17. A method according to claim 13, the temperature in the scrubber being between 90 and 120° F.

18. A method according to claim 13, the concentration of said organic compounds in said scrubbing liquor and in said purge being between 10 and 40 weight percent.

19. A method according to claim 13, the concentration of said organic compounds being substantially greater than the saturation point thereof in water to thereby form a slurry of said organic compounds in a saturated solution thereof in water, the maximum solids concentration in said slurry being between 15 and 20 percent by weight.

20. A method according to claim 19, said maximum solids concentration being between 10 and 12% by weight.

21. A method according to claim 13, said effluent waste gases being at an elevated temperature and the temperature of said scrubbing liquor being substantially less than the temperature of said effluent gases, whereby water in said scrubbing liquor is evaporated and saturates the scrubbed effluent gas and whereby the effluent waste gases are cooled by such evaporation.

22. An apparatus for removing pollutant organic compounds from chemical waste off gases comprising a scrubber having an inlet for introducing said gases to said scrubber and an inlet for introducing scrubbing liquor to provide scrubbing of said gases, an outlet for removing the scrubbed gas and an outlet for removing the scrubbing liquor, means for recycling the scrubbing liquor to build up the concentration of said pollutant organic compounds therein, means for purging a predetermined amount of said concentrated recycle liquor, incinerator means for vaporizing said purge liquor and burning said concentrated organic compounds therein to non-pollutant compounds, means for flowing said purge liquor to said incinerator means, means for inletting fuel to said incinerator means, means for inletting combustion air to said incinerator means to burn said fuel and said organic compounds to non-pollutant compounds, and means for discharging the incinerated gases to the atmosphere.

23. An apparatus according to claim 22. including means for inletting fresh scrubbing liquor to said scrubber to replace the scrubbing liquor removed in the purge liquor and evaporated and removed in the scrubbed gas outletting from said scrubber.

24. An apparatus according to claim 22, including means for atomizing said purge before burning it.

25. An apparatus according to claim 22, said scrubber being a multi-stage scrubber, each of said stages having means for recycling scrubbing liquor to concentrate said organic compounds, each of said stages having means for purging the recycle stream, means for flowing the purge from said first stage to said incinerator, means for flowing the purge from each succeeding stage to the preceding stage as part of the scrubbing liquor makeup of said preceding stage together with the recycle of said preceding stage, means for inletting fresh scrubbing liquor to the final stage and for mixing the same with recycle from said final stage to make up the scrubbing liquor of said final stage.

26. In an apparatus for manufacturing phthalic anhydride by oxidizing o-xylene or naphthalene with air to form a product gas from which phthalic anhydride is removed by condensation in a condenser, the improvement comprising an apparatus for removing pollutant organic compounds from the off gases from said condenser before discharge to the atmosphere, said apparatus comprising a scrubber having an inlet for introducing said off gases to said scrubber, and an inlet for introducing scrubbing liquor to provide scrubbing of said gases, an outlet for removing the scrubbed gases and an outlet for removing the scrubbing liquor, means for recycling the scrubbing liquor to build up the concentration of said pollutant organic compounds therein, means for purging a predetermined amount of said concentrated recycle liquor, an incinerator for vaporizing said purge liquor and burning said concentrated organic compounds therein, means for flowing said purge liquor to said incinerator, means for inletting combustion air to said incinerator for burning said organic compounds and means for discharging the incinerated gases to the atmosphere.

References Cited

UNITED STATES PATENTS

| | | | |
|---|---|---|---|
| 1,892,681 | 1/1933 | Rankin | 210—181 |
| 2,242,594 | 2/1941 | Fox et al. | 55—85 |
| 2,448,868 | 9/1948 | Davis | 55—82 |
| 2,812,037 | 11/1957 | Stephan et al. | 55—82 |
| 2,838,135 | 6/1958 | Pilo et al. | 55—94 X |
| 3,011,966 | 12/1961 | Jahnentz et al. | 55—85 X |
| 3,507,788 | 4/1970 | Cole et al. | 210—71 X |

JAMES L. DE CESARE, Primary Examiner

J. ADEE, Assistant Examiner